(12) United States Patent
Hall et al.

(10) Patent No.: US 7,567,658 B1
(45) Date of Patent: Jul. 28, 2009

(54) METHOD TO VERIFY DESIGNATION OF PAY TELEPHONE WITH AN INTEREXCHANGE CARRIER

(75) Inventors: Larry D. Hall, Richardson, TX (US); Donn C. Hotchkin, Keller, TX (US)

(73) Assignee: Intellicall, Inc., Farmers Branch, TX (US)

( * ) Notice: Subject to any disclaimer, the term of this patent is extended or adjusted under 35 U.S.C. 154(b) by 946 days.

(21) Appl. No.: 11/157,813

(22) Filed: Jun. 22, 2005

(51) Int. Cl.
*H04M 17/00* (2006.01)
*H04M 15/00* (2006.01)

(52) U.S. Cl. ............ 379/143; 379/144.05; 379/114.05; 379/127.01

(58) Field of Classification Search ................. 379/143, 379/144.02, 144.05, 144.07, 154, 155, 114.01, 379/114.05, 115.01, 118, 127.01–127.03, 379/201.03

See application file for complete search history.

(56) References Cited

U.S. PATENT DOCUMENTS

| | | | |
|---|---|---|---|
| 4,310,720 A | 1/1982 | Check, Jr. | |
| 4,430,728 A | 2/1984 | Beitel et al. | |
| 4,685,126 A | 8/1987 | Silverbush | |
| 4,760,594 A | 7/1988 | Reed | |
| 4,779,224 A | 10/1988 | Moseley et al. | |
| 4,797,910 A | 1/1989 | Daudelin | |
| 4,825,354 A | 4/1989 | Agrawal et al. | |
| 4,873,662 A | 10/1989 | Sargent | |
| 4,882,752 A | 11/1989 | Lindman et al. | |
| 4,916,733 A | 4/1990 | Smith et al. | |
| 4,916,738 A | 4/1990 | Chandra et al. | |
| 4,920,562 A | 4/1990 | Hird et al. | |
| 4,935,956 A | 6/1990 | Hellwarth et al. | |
| 4,955,052 A | 9/1990 | Hussain | |
| 5,278,904 A | 1/1994 | Servi | |
| 5,715,448 A | 2/1998 | Suzuki et al. | |
| 5,850,432 A | 12/1998 | Desai et al. | |
| 5,943,397 A | 8/1999 | Gabin et al. | |
| 6,038,563 A | 3/2000 | Bapat et al. | |
| 6,085,191 A | 7/2000 | Fisher et al. | |
| 6,222,912 B1 * | 4/2001 | Breuer | 379/114.24 |
| 6,415,025 B1 | 7/2002 | Bruno et al. | |
| 6,430,277 B1 | 8/2002 | Roadifer et al. | |
| 6,647,112 B2 | 11/2003 | Smith | |

(Continued)

FOREIGN PATENT DOCUMENTS

WO    WO 87/02208    4/1987

(Continued)

*Primary Examiner*—Quoc D Tran
(74) *Attorney, Agent, or Firm*—Richard C. Litman

(57) ABSTRACT

The method to verify designation of pay telephone with an exchange carrier determines receipt of private pay telephone designation for a private pay telephone (PPT) by an interexchange carrier (IXC). The PPT is programmed with at least one telephone number to an IXC in its storage memory. Using that stored number, the PPT calls on its connected telephone line to the IXC. The PPT determines, without manual intervention, whether a response from the IXC is indicative of a status of receipt of PPT designation for the PPT to receive Dial-Around Compensation by the IXC. The PPT then generates a record and stores the record of the response from the IXC in the storage memory of the PPT. Finally, the PPT communicates the stored record of the response from the IXC to the private pay telephone provider.

38 Claims, 4 Drawing Sheets

U.S. PATENT DOCUMENTS

| | | |
|---|---|---|
| 6,654,451 B1 | 11/2003 | Ward |
| 6,694,007 B2 | 2/2004 | Lang et al. |
| 2002/0080940 A1* | 6/2002 | Roadifer et al. ........ 379/127.02 |
| 2002/0178364 A1 | 11/2002 | Weiss |
| 2003/0181197 A1 | 9/2003 | Larsson |
| 2003/0185204 A1 | 10/2003 | Murdock |
| 2003/0187850 A1 | 10/2003 | Reed et al. |
| 2004/0078374 A1 | 4/2004 | Hamilton |

FOREIGN PATENT DOCUMENTS

| | | |
|---|---|---|
| WO | WO 98/21902 | 5/1998 |

* cited by examiner

METHOD TO VERIFY DESIGNATION OF PAY TELEPHONE WITH AN INTEREXCHANGE CARRIER

BACKGROUND OF THE INVENTION

1. Field of the Invention

The present invention relates to an automated method of determining receipt of a private pay telephone designation by an interexchange carrier.

2. Description of the Related Art

A private pay telephone is a telephony device owned by private individuals and/or corporations, known as payphone service providers (PSP), designed for communicating voice and/or TTY calls connected to a public switched telephone network via a local exchange carrier (LEC).

When a call is made from a private pay telephone, several numbers and codes are sent from the LEC to the public switched telephone network. These numbers and codes are used for several purposes in the public switched telephone network, one specifically being to identify the unit as a private pay telephone. The identification of the calling telephone as a private pay telephone to the Interexchange Carrier is important, as the PSP receives Dial-Around Compensation.

Dial-Around Compensation is the payment made to the PSP by the Interexchange Carriers for toll-free calls made from their equipment in which the PSP receives no coin revenue. An example is an 800-number prepaid calling card providing for a reduced long distance rate. For the PSP to receive the Dial-Around Compensation, the Interexchange Carrier must receive the proper identifying code from the private pay telephone.

The current method of verifying the receipt of the proper identifying code by the Interexchange Carrier is for the PSP to send a technician to each telephone, who calls a separate number for each Interexchange Carrier and listens to an automated response. This method is costly, time consuming, and introduces a human error element. In addition, the technician can only check a limited number of telephones per day.

Thus, an automated method of determining receipt of private pay telephone designation by an Interexchange Carrier solving the aforementioned problems is desired.

SUMMARY OF THE INVENTION

The method to verify designation of a pay telephone with an interexchange carrier is a method for determining receipt of a private pay telephone designation by an interexchange carrier for calls made from a private pay telephone automatically and without human intervention at the pay telephone.

The private pay telephone includes a processor with a programmable memory, a storage memory, and a communication device connected to a telephone line. The private pay telephone is programmed with at least one telephone number to an interexchange carrier in the storage memory. Using the stored number, the private pay telephone calls the interexchange carrier via the connected telephone line.

The private pay telephone determines a response from the interexchange carrier without manual intervention. The response is indicative of the status of receipt of private pay telephone designation for the private pay telephone by the interexchange carrier.

The private pay telephone then generates a record of the response and stores that record in the storage memory of the private pay telephone.

Finally, the private pay telephone communicates the stored record of the response from the interexchange carrier to a remote site for review by the private pay telephone provider.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to private pay telephones owned by private individuals and/or corporations, known as payphone service providers (PSP), designed for communicating voice and/or TTY calls connected to a public switched telephone network (PSTN).

A public switched telephone network (PSTN) is the concatenation of the world's public circuit-switched telephone networks, in much the same way that the Internet is the concatenation of the world's public IP-based packet-switched networks. Originally, a network of fixed-line analog telephone systems, the PSTN is now almost entirely digital, and now includes mobile as well as fixed telephones. In the United States, wireline telephone companies are divided into two large categories: long distance (interexchange carrier, or IXCs) and local (local exchange carrier, or LECs). An IXC is a legal and regulatory term for a telecommunications company, commonly called a long-distance telephone company, such as AT&T, MCI, and Sprint. An IXC is defined as carriers that provide inter LATA (Local Access and Transport Area) communication.

Figure 1:
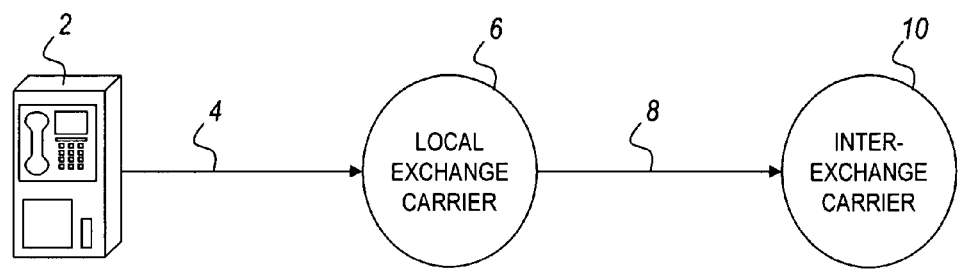
FIG. 1 is a block diagram of a representative telephone network configuration upon which the method to verify designation of a pay telephone with an interexchange carrier may be practiced, demonstrating the signal path from a private pay telephone through a local exchange carrier to an interexchange carrier.

As shown diagrammatically in FIG. 1, when a long distance call is made from a private pay telephone 2, a first signal 4 is sent to the local exchange carrier 6, but several numbers and codes in addition to the long-distance call number are sent in the signal 8 from the local telephone company 6 providing local telephone access, i.e., a local exchange carrier (LEC), to the long-distance telephone company, i.e., an interexchange carrier (IXC), 10.

The numbers and codes added to the second signal 8 are used for several purposes in the PSTN, one specifically pertinent to the instant invention being to identify the calling unit as a private pay telephone to the IXC 10. The identification of the calling telephone as a private pay telephone to the IXC is important, as the payphone service provider (PSP) receives Dial-Around Compensation for toll-free calls made on the PSP's private pay telephones.

Dial-Around Compensation is the payment made to the PSP by the IXCs for toll-free calls made from PSP equipment in which the PSP receives no coin revenue. An example is an 800-number prepaid calling card providing for a reduced long distance rate. For the PSP to receive the Dial-Around Compensation, the IXC must receive a proper identifying code from a private pay telephone.

The IXC issues an automated response when a private pay telephone calls an IXC at a particular predetermined number to determine if the private pay telephone is designated or registered to receive Dial-Around Compensation. The IXC responds with one of two audio messages, depending on whether the identifying code from the private pay telephone matches the IXC's registry of private pay telephones designated to receive Dial-Around Compensation. If a code matching the IXC's registry of designated private pay phones is received, a spoken audio message is played confirming that the IXC received the proper identification code and has verified the call has been received from a designated private pay phone, followed by a call termination signal. If no code is received, or the received code fails to match any entry on the IXC's registry of designated private pay phones, a different spoken audio message is played that indicates the call has been received from a phone that is not designated as a private pay phone entitled to receive Dial-Around Compensation, followed by a call termination signal. Generally, the IXC messages identifying the designation or non-designation of private pay phones registered to receive Dial-Around Compensation are of different audio lengths due to the different content of the spoken audio messages.

Figure 2:
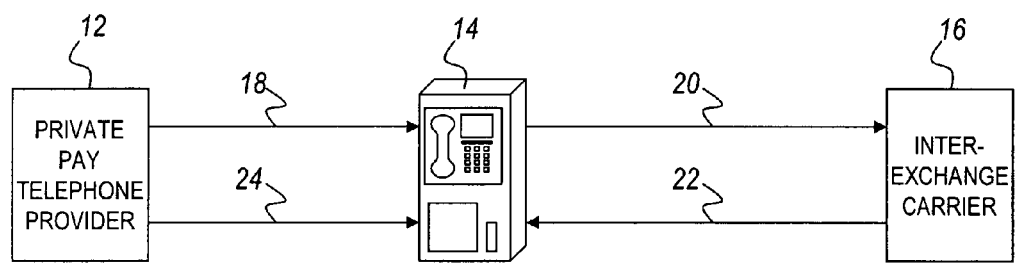
FIG. 2 is a block diagram of the flow of communications in a method to verify designation of a pay telephone with an interexchange carrier according to the present invention.

The present invention provides an automatic method of verifying the designation of a private pay telephone by an IXC. A first embodiment of the invention, as shown in FIG. 2, provides for a private pay telephone 14 that includes a processor with a programmable memory, a storage memory, and a communication device, such as a modem or other data communication device, connected to a telephone communication line. A private pay telephone provider 12, i.e., a PSP, programs at least one telephone number for calling an interexchange carrier 16 in the storage memory of the private pay telephone 14. The programming of any telephone numbers by the private pay telephone provider 12 into the private pay telephone 14 may be accomplished via transmission on a telephone line, as designated by the signal at 18, for storage in the storage memory of the private pay telephone 14, or the telephone numbers may be preprogrammed in the storage memory of the private pay telephone 14. In a preferred embodiment of the invention, each IXC's verification telephone number may be programmed into the private pay telephone 14 by either of the above methods so that a single private pay telephone is able to call and determine the status of its designation to receive Dial-Around Compensation from each IXC.

The private pay telephone 14 then calls the interexchange carrier 16 (via a local exchange carrier 6, FIG. 1, not shown in FIGS. 2 & 4-5), on a telephone line with the preprogrammed telephone number via signal 20 to the IXC. The private pay telephone 14 may be programmed to call the IXC 16 at a predetermined time or at scheduled intervals of time by a preprogrammed calling schedule. The IXC 16 receives the telephone call, reads the coded information identifying the private pay telephone in the telephone call (if present), determines if the private pay telephone 14 based on the received coded information has been previously designated with the IXC 16 as a private pay telephone authorized to receive Dial-Around Compensation, and communicates one of two verification messages, as indicated by signal 22, to the private pay telephone 14 selected according to whether designation to receive Dial Around Compensation has been confirmed. The purpose of the verification message from the IXC 16 is to audibly notify the caller whether the private pay telephone has been designated to receive Dial-Around Compensation.

In order to detect the content of the message transmitted by IXC 16 to private pay telephone 14 without manual intervention, the private pay telephone 14 must automatically determine which of the two messages from IXC 16 it is receiving: a non-designated private pay phone message, or a designated private pay phone message.

A first method for determining the status of receipt of private pay telephone designation by the IXC 16 is for private pay telephone 14 to initiate a call timer for a predetermined period of time upon connection to the IXC 16. The private pay telephone 14 then determines whether a call termination signal received from the IXC 16 is within the predetermined period of time based on the call timer. When the call termination signal is received, it is compared to the predetermined period of time so that the private pay telephone determines the status of the receipt of private pay telephone designation by the length of the call.

For example, a non-designation and a designation message from the IXC 16 usually have different time lengths due to the difference in the audible message provided by the IXC for designated private pay phones and non-designated phones. If the length of each of the messages is known, then the predetermined period of time as set by private pay telephone 14 will be set to begin when the answer to the call starts and set to end at a time midway between the standard length of the shorter message and the longer message. When a call termination signal is received before the predetermined period of time expires, the shorter of the two messages will be identified and its associated designation/non-designation content will be determined accordingly. When a call termination signal is received after the predetermined period of time expires, the longer of the two messages will be identified and its associated content will be determined accordingly.

An alternative method may comprise only identifying the call termination signal for the shorter message within the predetermined period of time and not waiting for the call termination signal of the longer message to determine which message is received. Therefore, if the call termination signal is not received with the predetermined period of time, the second and longer message is assumed to be transmitted.

The predetermined period of time may alternatively be set to begin when the call is answered and set to end based upon the median length of a standard short message. In yet another alternative, the private pay telephone 14 places the call to the IXC 16, records the time that the call is answered, and records the time that the call termination signal is received. These times are then communicated to the private pay telephone provider 12, which then determines whether the IXC 16 has properly designated the private pay telephone as eligible to receive Dial-Around Compensation based upon the length of the call.

A second method for determining the status of receipt of private pay telephone designation by the IXC 16 is for private pay telephone 14 to initiate an audio recording of the communication received from the IXC 16 upon connection of the telephone call to the IXC 16. The audio recording is then terminated by the private pay telephone 14 upon receipt of the call termination signal. The processor of the private pay telephone 14 analyzes the recorded communication from the IXC 16 to determine the status of receipt of private pay telephone designation. This step of analyzing identifies spoken language content from the recorded communication from IXC 16, e.g., by voice recognition software, and compares this spoken language content to stored patterns of spoken language content in the storage memory of the private pay telephone 14. The processor of private pay telephone 14 then determines the status of receipt of proper pay telephone designation based on comparing the analyzed spoken language content of the recorder communication with the pre-stored patterns of spoken language content.

A record is generated based on both of the above alternative steps of determining which of the designation messages is received by the private pay telephone 14 from the IXC 16, and is then stored in the storage memory of the private pay telephone 14 for downloading or communicating to a remote site, for example, the private pay telephone provider 12.

Finally, the stored response of either of the above methods is communicated to the payphone service provider (PSP), i.e., the private pay telephone provider 12. The preferred method of initiating this communication is where the private pay telephone provider 12 initiates a query 24 to the private pay telephone 14 to provide the private pay telephone provider 12 with the stored records of the status of receipt of private pay telephone designation by an IXC. The private pay telephone 14 responds to the query 24 of private pay telephone provider 12 and transmits or downloads the contents of its memory associated with any previously stored records of the status of designation for a private pay telephone by an IXC. An alternative method may include the private pay telephone 14 automatically initiating communication with a private pay telephone provider 12 or any other data collection service at predetermined time intervals to communicate the stored records of the status of designation for a private pay telephone by an interexchange carrier (not shown in FIG. 2).

Figure 3:
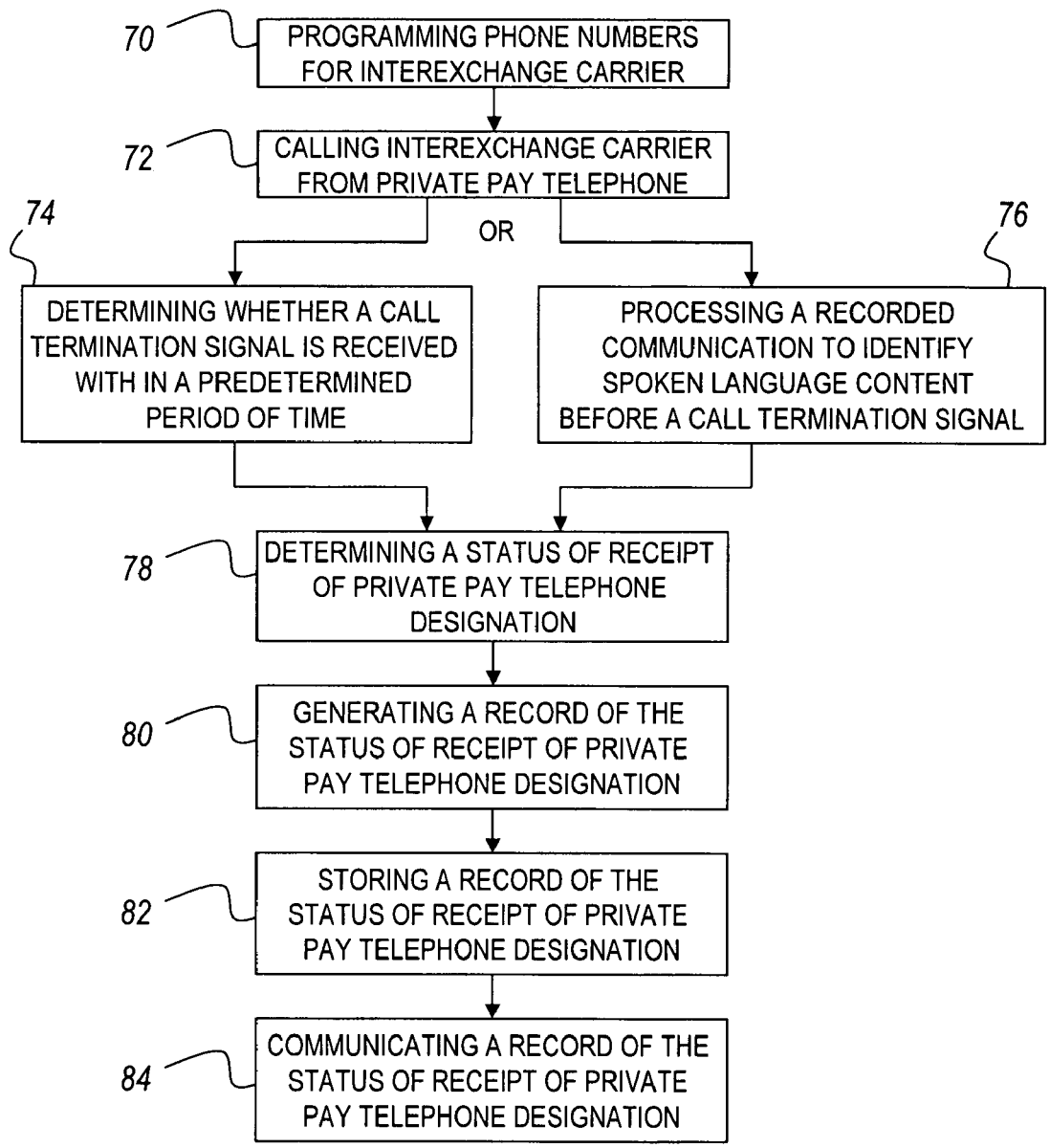
FIG. 3 is a flowchart showing an overview of the steps of a method to verify designation of a pay telephone with an interexchange carrier according to the present invention.

FIG. 3 illustrates a flowchart listing the steps of the above-described first embodiment of the invention, representing both methods of determining the status of designation of a private pay telephone by an interexchange carrier. The first step 70 includes programming phone numbers for an interexchange carrier into a private pay telephone. Then, using the program to phone numbers for the interexchange carrier, the private pay telephone calls the interexchange carrier, as indicated at step 72. The diagram then shows either the step 74 of determining whether a call termination signal is received within a predetermined period of time, or the step 76 of processing a recorded communication to identify spoken language content before a call termination signal, as a prerequisite step to the step 78 of determining a status of receipt of private pay telephone designation by the interexchange carrier. A record of the status of receipt of private pay telephone designation is generated at step 80, then stored at step 82, and finally, communicated to the private pay telephone provider at step 84.

Figure 4:
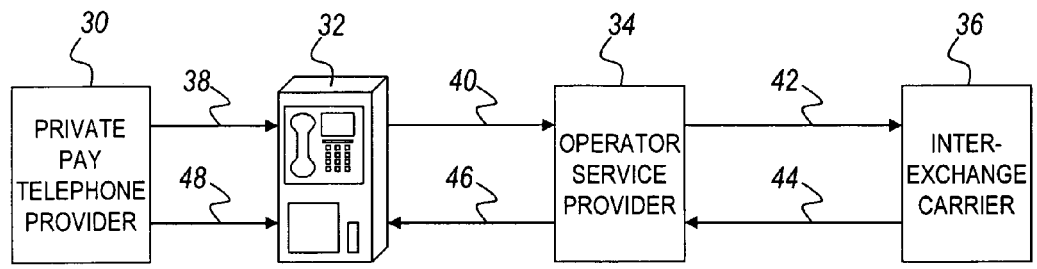
FIG. 4 is a block diagram of the flow of communications in a second embodiment of the method of the present invention.

A block diagram of communications flow in a second embodiment of the invention is represented in FIG. 4. The difference between this embodiment and the first embodiment of the invention is that a private pay telephone provider 30 programs a private pay telephone 32, as indicated by signal 38, with at least one telephone number to an operator service provider 34. Additionally, the operator service provider 34 is programmed with a telephone number to an interexchange carrier 36. The programming of the operator service provider 34 may be accomplished by communication from the private pay telephone provider 30 or from any other remote communication programming.

The purpose of the operator service provider 34 in this and the following general embodiments is to provide for the processing and status determining capabilities of the designation of a private pay telephone by the interexchange carrier 36 if a private pay telephone 32 fails to have the processor and hardware requirements sufficient to independently determine which response it receives from the interexchange carrier 36. Typically, this alternative application of the invention may be applied to older private pay telephones that lack the processing and/or programming capacity of the private pay telephone 14 described above in the first embodiment of the invention, as shown in FIG. 2. In the second embodiment, the private pay telephone 32 merely needs to include a storage memory and a communication device connected to a telephone line. The operator service provider 34 may include a processor with a programmable memory, a storage memory, and a communication device connected to a telephone line (in similar configuration to the private pay telephone 14 of the first embodiment).

The private pay telephone 32 initiates a call, indicated by signal 40, in similar fashion to the first embodiment as described above, to the operator service provider 34 based on the stored number to the operator service provider 34. The operator service provider 34 identifies the codes in signal 40 associated with the call from the private pay telephone 32, and calls interexchange carrier 36 based on its programmed telephone number associated both with the private pay telephone 32 and the interexchange carrier 36, as indicated by signal 42.

Interexchange carrier 36 then responds by signal 44 to the codes transmitted by the operator service provider 34, identifying the private pay telephone 32 as to whether private pay telephone 32 is designated by the interexchange carrier 36 for Dial-Around Compensation. Operator service provider 34 determines automatically which response from the interexchange carrier 36 is being transmitted, based upon either alternative method as disclosed above in the first embodiment of the invention. The operator service provider 34 generates a record of the response from the interexchange carrier 36, transmits the response by signal 46 to the private pay telephone 32 for storage, and the response is then retrieved by, or communicated to, the private pay telephone provider 30 upon either a query signal 48 by the private pay telephone provider 30, or on the initiative of the private pay telephone 32 alone (not shown in FIG. 4), as described above in the first embodiment of the invention.

Figure 5:
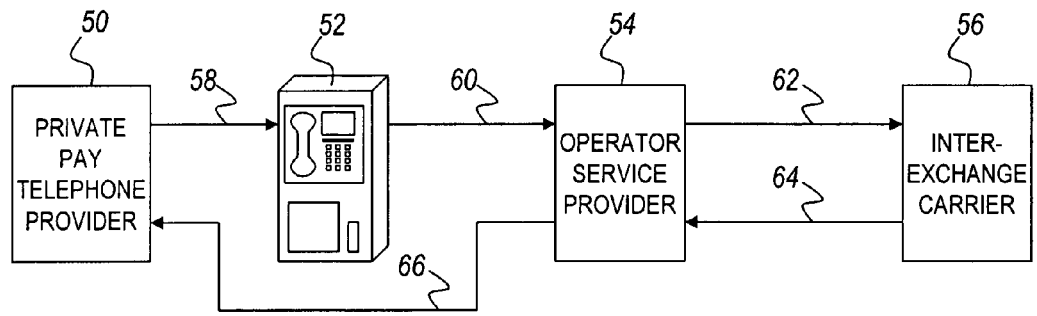
FIG. 5 is a block diagram of the flow of communications in a third embodiment of the method of the present invention.

The communications flow in a third embodiment of the invention is represented in FIG. 5. The difference between the third embodiment and the second embodiment of the invention is that in the third embodiment, the operator service provider 54 communicates a stored response of the status of designation for a private pay telephone by an interexchange carrier 56 directly to a private pay telephone provider 50, rather than to the private pay telephone 52. This present embodiment anticipates a very limited processing and programming capability at the private pay telephone 52, and allows the operator service provider 54 to manage most of the processing and communications functions.

In this embodiment, private pay telephone provider 50 programs a least one telephone number to an operator service provider in the storage memory of the private pay telephone 52, which may be done either directly or remotely by signal 58. In addition, the operator service provider 54 is programmed with a telephone number to the interexchange carrier 56. As above, the programming of the operator service provider 54 may be accomplished by communication from the private pay telephone provider 50 or any other remote communication programming.

The private pay telephone 52 initiates a call, signified by signal 60, in similar fashion to the first and second embodiments described above, to the operator service provider 54 based on the stored number of the operator service provider 54. The operator service provider 54 identifies the codes associated with the signal 60 of the private pay telephone 52, and calls interexchange carrier 56 based on its programmed telephone number associated both with the private pay telephone 52 and the interexchange carrier 56, as indicated by signal 62, which includes or encodes the identifying codes associated with private pay telephone 52.

Interexchange carrier 56 then responds to the operator service provider call by signal 64 by identifying whether the private pay telephone 52 is designated by the interexchange carrier 56 to receive Dial-Around Compensation. Operator service provider 54 determines automatically which response from the interexchange carrier 56 is being transmitted based upon either of the alternative methods disclosed above in the first embodiment of the invention. The operator service provider 54 generates a record of the response from the interexchange carrier 56, stores the response in a storage memory location in the operator service provider 54, and then communicates this response by signal 66 to the private pay telephone provider 50 either upon a query by the private pay telephone provider 50 to the operator service provider 50, or upon the initiative of the operator service provider 54 alone to communicate with the private pay telephone provider 50 (not shown in FIG. 5).

Figure 6:
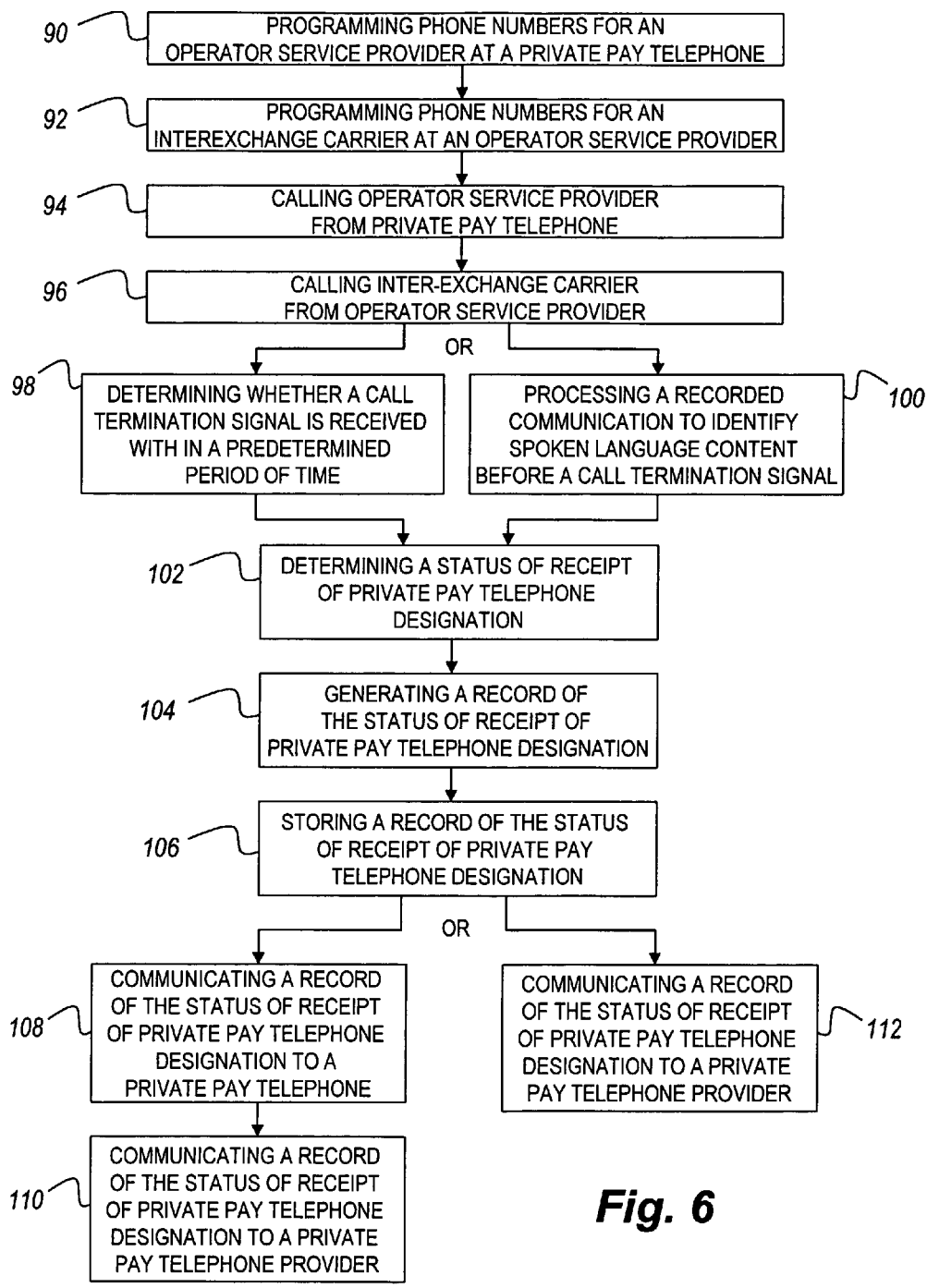
FIG. 6 is a flowchart showing an overview of the steps of a second and a third embodiment of the method of the present invention.

FIG. 6 illustrates a flowchart of the steps above described for carrying out the second and third embodiment of the invention, representing both methods of determining the status of designation of a private pay telephone by an interexchange carrier. The first step 90 includes programming a phone number for operator service provider at a private pay telephone. Next, at step 92, a phone number for an interexchange carrier or carriers is programmed into an operator service provider 92. After the telephone numbers have both been programmed, the private pay telephone calls the operator service provider with its preprogrammed number at step 94. The operator service provider, in turn, calls the interexchange carrier with its preprogrammed number, as indicated at step 96. The diagram then shows either the step 98 of determining whether a call termination signal is received within a predetermined period of time, or the step 100 of processing a recorded communication to identify spoken language contents before a call termination signal, as a prerequisite step to the step 102 of determining a status of receipt of private pay telephone designation by the interexchange carrier. A record of the status of receipt of private pay telephone designation is generated at step 104, and stored at step 106. The record, as illustrated above in the second embodiment of the invention, is communicated at step 108 to a private pay telephone and then further communicated at step 110 to a private pay telephone provider. In the alternative, as illustrated above in the third embodiment of the invention, the record is communicated directly to a private pay telephone provider, as indicated by step 112.

The described invention eliminates the need for human intervention in determining the response received from the interexchange carrier. It further allows verification to occur at off-peak hours and multiple verifications without a human visit. This reduces operating costs for technical help and human error in recording the response received.

It is to be understood that the present invention is not limited to the embodiments described above, but encompasses any and all embodiments within the scope of the following claims.

We claim:

1. A method for determining receipt of private pay telephone designation for a private pay telephone by an interexchange carrier, the private pay telephone having a processor with a programmable memory, a storage memory, and a communication device connected to a telephone line, the method comprising the steps of:

programming at least one telephone number to an interexchange carrier into the storage memory of the private pay telephone;

placing a call from the private pay telephone to the interexchange carrier over the telephone line using the at least one telephone number;

receiving a response to the call from the interexchange carrier, the response indicating whether the interexchange carrier received the call from a private pay telephone having a status designated to receive dial-around compensation;

determining at said private pay telephone, without manual intervention, the status designated by the interexchange carrier in the response;

generating a record of the response from said determining step;

storing the record of the response from said interexchange carrier in the storage memory of the private pay telephone; and communicating the stored record of the response to a corresponding private pay telephone provider.

2. The method for determining receipt of claim 1, wherein said communication device comprises a modem for receiving and transmitting data.

3. The method for determining receipt of claim 1, wherein said step of programming further comprises the steps of:

receiving from a remote location the at least one telephone number via the communication device of said private pay telephone; and storing the at least one telephone number in said storage memory of said private pay telephone.

4. The method for determining receipt of claim 3, wherein said remote location is the private pay telephone provider.

5. The method for determining receipt of claim 1, wherein said step of placing a call from the private pay telephone to the interexchange carrier further comprises a calling step selected from the group consisting of calling the interexchange carrier at a predetermined time and calling the interexchange carrier at preprogrammed intervals of time.

6. The method for determining receipt of claim 1, wherein said determining step further comprises the steps of:

initiating a call timer on the private pay telephone for a predetermined period of time; and determining whether a call termination signal is received from the interexchange carrier within said predetermined period of time.

7. The method for determining receipt of claim 1, wherein said determining step further comprises the steps of:

initiating a recording of communication from the interexchange carrier upon connection to said interexchange carrier;

terminating said recording of communication from the interexchange carrier upon receipt of a call termination signal from the interexchange carrier; and analyzing said recorded communication from the interexchange carrier to determine whether the interexchange carrier recognizes the call of said placing step as being received from a private pay telephone having a status designated for receiving dial-around compensation.

8. The method for determining receipt of claim 7, wherein said step of analyzing comprises the steps of:
processing said recorded communication from the interexchange carrier by the processor of the private pay telephone to identify spoken language content from said recorded communication;
comparing said identified spoken language content from said recorded communication to stored patterns in said storage memory of said private pay telephone; and
determining the status of receipt of private pay telephone designation for said private pay telephone by the interexchange carrier based upon said step of comparing.

9. The method for determining receipt of claim 1, wherein said communicating step further comprises the steps of:
receiving a query for said stored record from a remote location;
responding to said query for said stored record; and
communicating said stored record of said response to said remote location based upon said step of responding to said query for said stored record of said response.

10. The method for determining receipt claim 9, wherein said remote location is the private pay telephone provider.

11. A method for determining receipt of private pay telephone designation for a private pay telephone by an interexchange carrier via an operator service provider, the private pay telephone having a storage memory and a communication device connected to a telephone line, the operator service provider having a processor with a programmable memory, a storage memory, and a communication device connected to a telephone line, the method comprising the steps of:
(a) programming at least one telephone number to an operator service provider into the storage memory of the private pay telephone;
(b) programming at least one telephone number to an interexchange carrier into the operator service provider;
(c) placing a call from the private pay telephone to the operator service provider using the stored operator service provider telephone number;
(d) placing a call from the operator service provider to the interexchange carrier using the stored interexchange carrier telephone number in response to step (c);
(e) receiving a response at the operator service provider from the interexchange carrier to the call placed in step (d), the response indicating whether the interexchange carrier received the call from a private pay telephone having a status designated to receive dial-around compensation;
(f) determining at the operator service provider, without manual intervention, the status designated by the interexchange carrier in the response;
(g) generating a record of the status as determined in step (f);
(h) storing the record generated in step (g) in the storage memory of the private pay telephone; and
(i) communicating the record stored in step (h) to a corresponding private pay telephone provider.

12. The method for determining receipt of claim 11, wherein the communication device of the private pay telephone and the communication device of the operator service provider each comprise a modem for receiving and transmitting data.

13. The method for determining receipt of claim 11, wherein step (a) further comprises:
receiving from a remote location the at least one telephone number to the operator service provider; and
storing the at least one telephone number to the operator service provider in the storage memory of the private pay telephone.

14. The method for determining receipt of claim 11, wherein step (b) further comprises:
receiving from a remote location the at least one telephone number to the interexchange carrier; and
storing the at least one telephone number to the interexchange carrier in the storage memory of the operator service provider.

15. The method for determining receipt of claim 14, wherein said remote location is a private pay telephone provider.

16. The method for determining receipt of claim 11, wherein step (c) further comprises a calling step selected from the group consisting of calling at a predetermined time and calling at preprogrammed intervals of time.

17. The method for determining receipt of claim 11, wherein step (d) further comprises a calling step selected from the group consisting of calling at a predetermined time and calling at preprogrammed intervals of time.

18. The method for determining receipt of claim 11, wherein step (f) further comprises the steps of:
initiating a call timer on the private pay telephone for a predetermined period of time; and
determining whether a call termination signal is received from the interexchange carrier within said predetermined period of time.

19. The method for determining receipt of claim 11, wherein step (f) further comprises the steps of:
initiating a recording of communication from the interexchange carrier upon connection to said interexchange carrier;
terminating said recording of communication from the interexchange carrier upon receipt of a call termination signal from the interexchange carrier; and
analyzing said recorded communication from the interexchange carrier to determine whether the interexchange carrier recognizes the call of said placing step as being received from a private pay telephone having a status designated for receiving dial-around compensation.

20. The method for determining receipt of claim 19, wherein said step of analyzing comprises the steps of:
processing said recorded communication from the interexchange carrier by the processor of the private pay telephone to identify spoken language content from said recorded communication;
comparing said identified spoken language content from said recorded communication to stored patterns in said storage memory of said private pay telephone; and
determining the status of receipt of private pay telephone designation for said private pay telephone by the interexchange carrier based upon said step of comparing.

21. The method for determining receipt of claim 11, wherein step (h) further comprises the steps of:
communicating the record of the response from the interexchange carrier from the operator service provider to the private pay telephone; and
storing the record on the private pay telephone.

22. The method for determining receipt of claim 11, wherein step (i) further comprises the steps of:
receiving a query for said stored record of said response from a remote location;
responding to said query for said stored record of said response; and communicating said stored record of said response to said remote location based upon said step of responding to said query for said stored record of said response.

23. The method for determining receipt of claim 22, wherein said remote location is the private pay telephone provider.

24. A method for determining receipt of private pay telephone designation for a private pay telephone by an interexchange carrier via an operator service provider, the private pay telephone having a storage memory and a communication device connected to a telephone line, the operator service provider having a processor with a programmable memory, a storage memory, and a communication device connected to a telephone line, the method comprising the steps of:
   (a) programming at least one telephone number to an operator service provider in the storage memory of the private pay telephone;
   (b) programming at least one telephone number to an interexchange carrier into the operator service provider;
   (c) placing a call from the private pay telephone to the operator service provider;
   (d) placing a call from the operator service provider to the interexchange carrier in response to receiving the call placed in step (c);
   (e) receiving a response at the operator service provider from the interexchange carrier to the call placed in step (d), the response indicating whether the interexchange carrier received the call from a private pay telephone having a status designated to receive dial-around compensation;
   (f) determining at the operator service provider, without manual intervention, the status designated by the interexchange carrier in the response;
   (g) generating a record of the status as determined in step (f);
   (h) storing the record generated in step (g) in the storage memory of the operator service provider; and
   (i) communicating the record stored in step (h) to a corresponding private pay telephone provider.

25. The method for determining receipt of claim 24, wherein the communication device of the private pay telephone and the communication device of the operator service provider each comprise a modem for receiving and transmitting data.

26. The method for determining receipt of claim 24, wherein step (a) further comprises:
   receiving from a remote location the at least one telephone number to the operator service provider; and
   storing the at least one telephone number to the operator service provider in the storage memory of the private pay telephone.

27. The method for determining receipt of claim 24, wherein step (b) further comprises:
   receiving from a remote location the at least one telephone number to the interexchange carrier; and
   storing the at least one telephone number to the interexchange carrier in the storage memory of the operator service provider.

28. The method for determining receipt of claim 27, wherein said remote location is a private pay telephone provider.

29. The method for determining receipt of claim 24, wherein step (c) further comprises a calling step selected from the group consisting of calling at a predetermined time and calling at preprogrammed intervals of time.

30. The method for determining receipt of claim 24, wherein step (d) further comprises a calling step selected from the group consisting of calling at a predetermined time and calling at preprogrammed intervals of time.

31. The method for determining receipt of claim 24, wherein step (f) further comprises the steps of:
   initiating a call timer on the private pay telephone for a predetermined period of time; and
   determining whether a call termination signal is received from the interexchange carrier within said predetermined period of time.

32. The method for determining receipt of claim 24, wherein step (f) further comprises the steps of:
   initiating a recording of communication from the interexchange carrier upon connection to said interexchange carrier;
   terminating said recording of communication from the interexchange carrier upon receipt of a call termination signal from the interexchange carrier; and
   analyzing said recorded communication from the interexchange carrier to determine whether the interexchange carrier recognizes the call of said placing step as being received from a private pay telephone having a status designated for receiving dial-around compensation.

33. The method for determining receipt of claim 32, wherein said step of analyzing comprises the steps of:
   processing said recorded communication from the interexchange carrier by the processor of the private pay telephone to identify spoken language content from said recorded communication;
   comparing said identified spoken language content from said recorded communication to stored patterns in said storage memory of said private pay telephone; and
   determining the status of receipt of private pay telephone designation for said private pay telephone by the interexchange carrier based upon said step of comparing.

34. The method for determining receipt of claim 24, wherein step (h) further comprises the steps of:
   communicating the record of the response from the interexchange carrier from the operator service provider to the private pay telephone; and
   storing the record on the private pay telephone.

35. The method for determining receipt of claim 24, wherein step (i) further comprises the steps of:
   receiving a query for said stored record of said response from a remote location;
   responding to said query for said stored record of said response; and
   communicating said stored record of said response to said remote location based upon said step of responding to said query for said stored record of said response.

36. The method for determining receipt of claim 35, wherein said remote location is the private pay telephone provider.

37. A management system for determining receipt of private pay telephone designation by an interexchange carrier, the system comprising:
   a private pay telephone provider having a processor, main memory, and a communication device adapted for connection to a telephone network;
   at least one private pay telephone having a processor, programmable memory, storage memory, and a communication device connected to the telephone network, the pay telephone having software stored therein and executable by the processor, the software including:
      means for initiating a telephone call to an interexchange carrier;
      means for receiving a response from the interchange carrier to the telephone call, the response designating the status of the caller regarding designation to receive dial-around compensation;

means for evaluating the response to determine the status without manual intervention; and means for communicating the status to the private pay telephone provider.

38. A management system for determining receipt of private pay telephone designation by an interexchange carrier comprising:

a private pay telephone provider having a processor, main memory, and a communication device adapted for connection to a telephone network a private pay telephone having a processor, a storage memory and a communication device adapted for connection to a telephone network;

an operator service provider having a processor, programmable memory, storage memory, and a communication device adapted for connection to a telephone line, the operation service provider having software stored thereon and executable on the operator service provider, the software including:

means for initiating a telephone call to an interexchange carrier upon receiving a telephone call from the private pay telephone;

means for receiving a response from the interchange carrier to the telephone call, the response designating the status of the caller regarding designation to receive dial-around compensation;

means for evaluating the response to determine the status without manual intervention; and means for communicating the status to the private pay telephone provider.

* * * * *